March 26, 1935.  W. H. CURTIS  1,995,798
KEY CUTTING MACHINE
Filed July 2, 1934
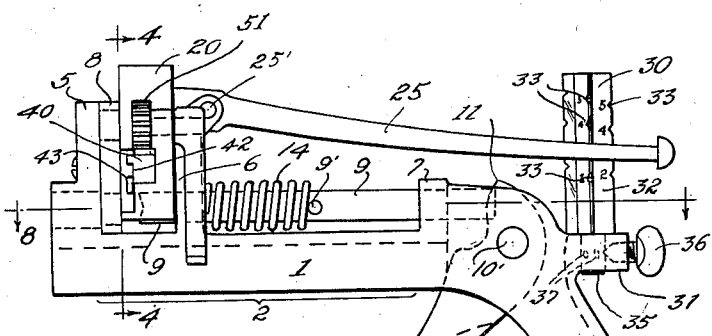
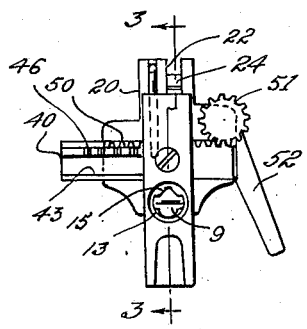
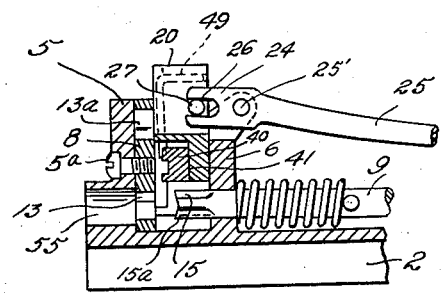
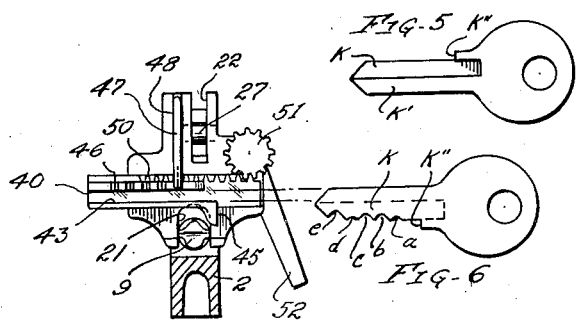
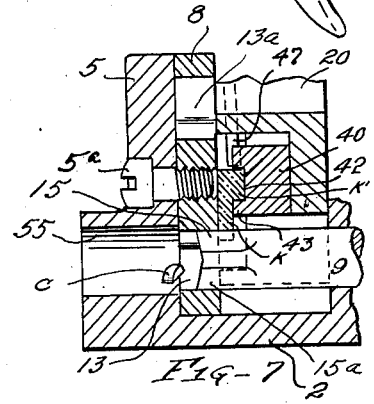
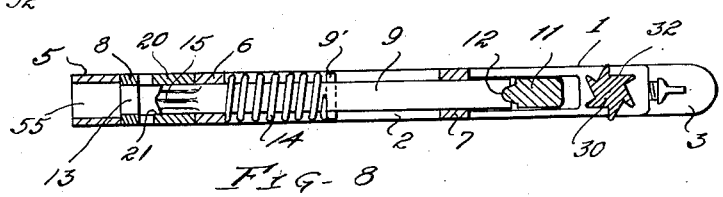
Inventor
William H. Curtis
By Soule & Leonard
Attorneys Patented Mar. 26, 1935

1,995,798

UNITED STATES PATENT OFFICE 1,995,798

KEY CUTTING MACHINE

William H. Curtis, Cleveland, Ohio

Application July 2, 1934, Serial No. 733,460

12 Claims. (Cl. 164—50)

This invention relates to machines for cutting key blanks and the principal object is to provide a machine which will properly and expeditiously form the required contour (notches e. g.) in a greater variety of pattern and greater variety of styles or types of blanks than will machines of this class already known or in use.

Another object is to provide a cutting machine for key blanks which may be easily and quickly adapted to cut blanks of widely varying cross sectional shape on the same cutting tool.

A further object is to provide a key blank cutter which may be easily and quickly adjusted to cut contour notches of different shapes in the blanks.

A specific object is to provide an improved cutting machine for key blanks wherein the key blank to be cut does not have to be moved from one guide to another in cutting notches of different depths.

Other objects include the provision of a key blank cutter which may be simply manufactured, will be extremely light in weight and extremely accurate in operation for long periods of time without requiring repair or service.

Further objects and features of the invention will become apparent from the following specification wherein reference is made to the accompanying drawing, in which:

Fig. 1 is a side elevation showing the preferred form of machine;

Fig. 2 is an end elevation of the cutting head and tool bed portion of the machine;

Figs. 3 and 4 are sectional views as indicated by the lines 3—3 and 4—4 on Figs. 2 and 1 respectively;

Fig. 5 is an elevation of an illustrative form of key blank;

Fig. 6 is a view of the reverse side of the same blank and showing an example of the contour notches cut therein on the machine;

Fig. 7 is an enlarged sectional view corresponding generally to Fig. 3, and showing a key blank in position to be cut; and Fig. 8 is a sectional plan as indicated on Fig. 1.

Key cutting machines heretofore made and particularly those of such proportions as to be held in the hand while cutting key blanks have been very limited in operating capabilities. Usually these machines are made for but one style of key blank and in the event the user has a large variety of key blanks to cut it is necessary to purchase a separate machine for each style or type of key. Furthermore, in this class of machine previously used, the key blanks had to be carefully shifted from one cutting position to another in the machine to enable cutting notches of different depths. The breadth of the notch receiving flanges in the blanks for different locks varies considerably and there are also wide variations in the relative depth of the notches and no prior machine to my knowledge is capable of operation covering the entire practical range of variations. The present machine overcomes the principal disadvantages of previous machines of its class, mentioned above, and approaches very nearly a universal key cutting machine capable of being made at low cost as a precision instrument, as will hereinafter be demonstrated.

Referring in detail to the drawing, 1 indicates the main frame or body of the machine, preferably made as a metal casting, provided with a bed portion 2 at the front end and a handle portion 3 at the rear end. Both portions are made hollow, as conventionally illustrated, to decrease weight. The portion 3 extends at an abrupt angle to the bed and generally conforms in contour to the palm of the human hand. The bed has upright brackets thereon at 5, 6 and 7, the bracket 5 supporting a suitable anvil or female die 8, against which the key blank is supported and cut as will be hereinafter shown. The brackets 6 and 7 support a blank cutting die in the form of a plunger 9. The plunger is formed to accurately and slidably fit suitable bores in the brackets 6 and 7 and may be inexpensively made from drill rod.

An operating lever 10 for the plunger is pivoted as at 10' within a hollow portion of the bed adjacent the handle 3, the upper end 11 of the lever being shaped to engage a transverse notch 12 in the rear of the plunger, as shown in Fig. 8, in a manner to prevent the plunger from turning on its axis during operation but permitting disengagement of the lever and plunger for purposes of adjustment by turning the plunger on its axis as will be later described.

The anvil is apertured as at 13 and, if desired, also apertured at 13a to receive the blank cutting end of the die or plunger, the plunger being operated to cut the blank by squeezing the handle and lever members 3 and 10 together in an obvious manner and being returned to initial position by a compression spring 14 which bears at its opposite ends against the bracket 6 and a cross pin 9' on the plunger.

The anvil comprises, as shown, a rectangular block—say of tool steel—seated at one end on the upper surface of the bed and at one side against the rear surface of the bracket 5, being secured in this position by a suitable screw 5a. If more than one die receiving aperture is provided the anvil may be simply reversed end for end to bring the apertures selectively into alignment with the die. To facilitate machining the aperture 13 and/or 13a these may be made open to the end of the block (not shown) so that the cutting surfaces and "leads" thereto may be formed on a milling machine instead of requiring a broaching operation.

The purpose of providing more than one aperture as at 13 and 13a and a reversible plunger is to enable the cutting of differently shaped contour notches, as at a, b etc. Fig. 6, on the different key blanks as required by the respective locks for which intended, and, of course, the contours of respective portions of the apertures and die are made to mutually conform insofar as such portions thereof effect cutting operations. The upper surface 15 of the forward portion of the die, in the position shown in Figs. 3 and 7, conforms to the upper inner surface of the aperture 13 (flat surfaces, as shown in Fig. 2, disposed at approximately 45° relative to each other and connected by a very short arc). The lower surfaces 15a of the die are complementary to the lower inner surfaces of the aperture 13a in the position shown, and these complementary surfaces may, for example, be cylindrically formed (for cutting more rounded notches e. g.). The surfaces of the aperture 13a which match the surfaces 15a of the die when inverted are, of course, downwardly disposed when the anvil is in the position shown in Fig. 3, but when the anvil and plunger are inverted (plunger turned 180° on its axis) both the surfaces 15a and the matching surfaces of 13a will be uppermost. Inversion of the plunger is accomplished by holding the plunger in outwardly moved position (to the left, Fig. 1) by any suitable tool, releasing the upper end 11 of the lever 10 from the notch 12 of the plunger and then turning the plunger to reverse the notch.

The key support includes, as shown, a vertically slidable head 20 supported in sliding contact with the anvil on one surface and in sliding contact with the bracket 6 on its opposite surface. The head has a slot 21 on its lower side adapted to straddle the plunger and bear thereagainst on both sides, as shown particularly in Fig. 4, thus locating the lower end of the head against movement transversely of the bed. The upper end of the head is also slotted as at 22 to receive the forward end 24 of an operating lever 25 by which the head is raised and lowered to determine the depth of cut in the blanks as will be more clearly hereinafter shown. The lever is pivoted at 25' between upstanding ears forming part of the bracket 6. The walls of the slot 22 closely embrace the forward end of the lever to prevent lateral movement of the upper end of the head 20 and, as a suitable positive connection beween the head and the lever, said forward end of the lever may be formed into a yoke as at 26, the head carrying a cross pin 27 closely embraced by the arms of the yoke. This connection operates as a gear toothed connection between the lever and head with substantially no lost motion.

The free end of the lever 25 extends over the bed and adjacent a suitable notched detent-dial 30. The detent-dial may comprise a post adapted to be adjustably secured in a bracket 31 at the rear of the frame 1 and adapted to be turned to bring a different vertical series of notches 33 into engagement with the lever 25 on each 60° turn of the post. The cross sectional shape of the post is shown in Fig. 3, this being generally star shaped providing broad faces at 32 adjacent the notches 33, which faces may be marked to indicate the type, style or make of lock of the keys to be cut in accordance with respective arrangements of notches adjacent such faces 32.

For adjustment the post, as shown, has a cylindrical reduced lower end 35 in close fitting relation to a vertical opening in the bracket 31 and the bracket carries a clamping screw 36 having a pointed end adapted to engage conical or circular openings or indentations 37 in the reduced end of the post. These are so located with respect to the notched edges of the post as to hold the notched edges adjacent the lever 25, which latter, adjacent the post, may have a surface (not shown) conforming to the shape of the notches. The point of the screw also holds the under face of the post in firm abutment with the top side of the bracket 31.

To support the key blanks on the head suitable replaceable carriages 40 (one being shown) are supported in the embrace of a slideway 41 on the head and these carriages are replaceable in the head in order that variations in the key blank sections may be better accommodated and the key blanks of all the different types or styles held firmly against the anvil 8. The only variation usually necessary in the different carriages is on the front face, namely that which engages the key blank, and this may be arranged to support and carry both single and double flanged keys of all different kinds both in thickness, breadth and cross section.

The key blank shown in Fig. 5, illustrates a common type of single flange key, the flange k on the blade of the key which receives the notches being formed by milling off a portion of the key blank as originally made leaving a rib at k' on one side of the blank (cf. Fig. 7). The blanks universally have a shoulder as at k'' adjacent the base portion of the flange k. In case the keys have double flanges the notches may be formed in both flanges by suitable adaptation of the carriage and/or anvil. In any event the carriage 40 for the key blanks is recessed as at 42 to receive the rib k' of the blank and the carriage has a rib as at 43 supporting the flange k' and adapted to bear against the surface of the flange k, shown in Fig. 5, holding the flat face of the blade against the anvil. The shoulder k'' engages the right hand end 45 of the rib 43 (Fig. 4) as will be clear from comparison of Figs. 4 and 6, the rib thus acting as a definite locating stop for the key blank. As shown the rib is enlarged downwardly at one end only to provide for engaging the shoulder of the blank though this is not usually necessary.

Near the upper portion of the carriage and on its front side are a suitable number of detent notches 46 adapted to be engaged by a suitable spring detent 47 inset, as shown, into a groove 48 on the front face of the head 20 and secured in place as in a drilled hole 49, see Fig. 3. The lower end of the detent engages the notches 46 one after the other as the carriage is moved to the right as shown in Fig. 4, the detent occupying the first notch in the illustrated position of the carriage. The carriage is thus properly located for cutting the notch a in the flange of the key blank, assuming, of course, that the head 20 is lowered to the proper position to bring the lower edge of the key blank flange into proper cooperative relationship to the upper (cutting) edge of the die.

The carriage may be moved manually in and out with relation to the head 20 but preferably means are provided to assist the operator in locating the carriage. This means, as shown, comprises rack teeth 50 on the upper side of the carriage, a pinion 51 or sector (not shown) suitably mounted on the head 20 and an operating arm 52 rigid with the pinion.

In placing the carriage into the head the operating arm 52 is swung down to a position close to the bed and the carriage then moved into the slideway 41 (from left to right, Figs. 2 and 4) until the rack tooth adjacent the right hand end of the carriage engages one of the teeth of the pinion and turns the pinion to completely mesh the two sets of teeth. Further upward movement of the arm 52 by the operator effects the different settings of the carriage to bring the key blank thereon into successive positions to be cut as determined by the notch 46 on the carriage which is temporarily engaged by the detent. The rear face of the carriage may be suitably marked (not shown) to indicate the different positions of the carriage—say from 1 to 5 with corresponding indicating lines on the carriage and a cooperating fixed line on the head.

The operation of cutting the notch has been previously referred to but in Fig. 7 this is more clearly illustrated, the front end of the die being shown as occupying the aperture 13 of the anvil, having been moved past the flange $k$ of the blank severing therefrom the chip $c$, which chip is ejected through an enlarged opening 55 in the front end of the body. Attention is called to the shape of the end portion of the die, this forming an open V, in case of adaptation for two kinds of notches, so that, instead of the die initially contacting with the blank flange along a relatively broad surface, the blank is first penetrated by a blunt point, such point contact having been found to more securely hold the key during the ensuing cutting operation, preventing slipping of the key out of place. Moreover a cleaner cut is effected with less strain on the machine because the shearing of the chip from the blank is done gradually.

It will be obvious from Figs. 4 and 6 that as the carriage is moved to the right the blank is successively positioned for cutting the notches $a$ to $e$ and it will be further seen by comparison with Fig. 1 that the depth of the notches will be determined by the position of the lever 25 in the detent notches 33, shallower notches being cut in the blank when the lever is in engagement with the lower detent notches 33 and deeper notches being cut when the lever engages the upper detent notches.

As previously mentioned, in some keys the breadth of the flange $k$ with relation to the total breadth of the blade is considerably greater than as illustrated in Fig. 5 and, in such event, the range of throw of the lever 25 must necessarily be different. Such variations as well as variations in relative depth of the notches on a single blank are taken care of by different settings of the detent-dial. Thus the throw of the lever 25 may be through a greater or lesser range than would be determined by the notches which are in operating position as shown in Fig. 1, or the series of detent notches may begin higher on the post for a narrow flange blank and end higher. Any conceivable variation in relative depth of notches on the blanks and/or variation in blank flange breadth may be thus provided for. I find I am able to accommodate all the variations in present day keys with less than six different arrangements of detent notches 33 and thus the six sided detent-dial 30 shown provides enough dial notches and indicating faces for present use without having to supply more than one detent-dial with each machine.

With respect to the carriages 40, all the keys required to be cut at the present time may be accommodated on six or seven different carriages.

It is well known that in cutting keys of the general type illustrated code books are furnished which show in symbol form the depth of the notches of the keys for different makes of locks and these, on authorized instructions to an operator, are translatable into the terms of the various dial and marker indications on the machine as above described or shown.

The terms "vertical", "front", "rear" etc., as used in the specification and claims are for convenience only and not by way of limitation.

I claim:

1. A key cutting machine comprising a frame, an anvil and die carried thereon and adapted to cut notches in a blank, a head slidable on the frame adjacent the anvil, means to support and guide a key blank on the head in position to be cut, and means to adjust the head on the frame comprising a lever pivoted to the frame and connected at one end to the head, and having its opposite end disposed remote from the head, and detent means on the frame to hold the said opposite end of the lever in a plurality of definite positions.

2. A machine according to claim 1, wherein said detent means comprises an adjustable dial having a plurality of series of notches, each series being engageable with the lever in respective adjusted positions of the dial.

3. A machine according to claim 1, wherein the head is movable in a manner to determine the depth of cut on the blank, and the key blank is slidably supported on the head to determine the positions of the notches along the key blank.

4. In a key cutting machine, a frame, an apertured anvil and a die carried on the frame adapted to cooperate with the anvil, a key blank support slidably mounted on the frame adjacent the anvil, said support having a slot straddling the die as a guide, said support being adapted and arranged to carry a key blank across the anvil in face to face contact therewith and move the same both longitudinally and transversely of the blank in definite steps.

5. In a key blank cutting machine a frame, having spaced parallel brackets thereon, one having an opening therethrough, a male and a female die supported by respective brackets, the male die being slidably supported in said opening, a carriage shaped on one face complementary to a key blank for supporting such blank in face of face contact with the female die, a head slidably supported on the bracket having said opening for movement transversely of the axis of the male die, and a guide on the head supporting the carriage for movement transversely of the said axis and at right angles to the direction of movement of the head, whereby the blank may be adjusted with reference to the dies for cutting notches therein by the dies at different positions lengthwise thereof and at different depths relative to one edge of such blank.

6. In a machine according to claim 5, the arrangement wherein the carriage moves on the head lengthwise of the blank.

7. In a key blank cutting machine a frame, an anvil and cooperating die carried by the frame, carriage supporting means slidably mounted on the frame and a carriage supported thereby movable transversely of the die and transversely of the direction of movement of the supporting means, said carriage, being adapted to support a key blank in face to face contact with the anvil, and spring detent means between the carriage and carriage supporting means for locating the carriage in definite positions of adjustment thereon.

8. In a key blank cutting machine, a frame, an anvil and die supported on the frame and operable to cut a key blank, a carriage adapted to support a key blank in face to face relation to the anvil, means on the frame to support the carriage, rack teeth on the carriage, a cooperating pinion on the said means, motion multiplying means on the pinion operable through the pinion to effect adjustment of the carriage on said means, and detent means operatively associated with the carriage to hold the same in a plurality of definite positions with respect to the anvil.

9. In a key blank cutting machine, a frame, an anvil mounted thereon and adapted to be secured thereto in two operating positions, a plurality of apertures in the anvil, a plunger incorporating a die element different portions of which are adapted to cooperate with respective apertures of the anvil, means for operating the plunger, and means to retain the plunger in different turned positions thereof on its own axis whereby the different die portions may cooperate with the respective apertures of the anvil in essentially the same location on the frame for each adjustment of the anvil and plunger.

10. In a key cutting machine, a frame having a horizontal bed at one end and a depending handle member at the other, a plunger-die mounted on the bed, an anvil having an opening to receive the die portion of the plunger, a hand lever pivoted to the frame adjacent the handle member and adapted to engage the plunger to operate it, a key blank supporting head adjacent the anvil and adapted to support a key blank in face to face contact with the anvil, said head being slidably mounted on the frame for vertical movement transverse to the direction of movement of the plunger for varying the position of cutting of the die on such key blank supported as stated.

11. In a key cutting machine, a bed and slidable die plunger thereon, spaced stationary brackets on the bed, an aperture in one bracket slidably supporting the die portion of the plunger, female die means on the other bracket arranged to support one face of a key blank and receive the die portion of the plunger, a block extending between said brackets and having means to guide and support a key blank for movement across said female die means lengthwise of the blank to determine the spacing of the key notches lengthwise of the blank, and means disposed between said brackets slidably supporting the block for movement toward and away from the bed to determine the depth of the notches.

12. A key cutting machine comprising a horizontal bed having a depending handle portion thereon, spaced stationary frame members rising from the bed, a die plunger mounted on the bed, the mounting including an opening through one of the frame members slidably fitting and supporting the die plunger, a lever adjacent the said handle portion, one end of the lever operatively engaging the plunger whereby the operator may operate the plunger by one hand while supporting the machine in the same hand, an apertured anvil in fixed position on one of said frame members, said anvil receiving the die portion of the plunger and being adapted to support one face of the key blank to be cut, a carrier disposed between the anvil and the other of said frame members and slidably supported on said last mentioned frame member, said carrier having a guide for receiving the key blank and supporting the face thereof opposite from the anvil engaging face, said carrier being vertically adjustable to determine the depth of cut with relation to one edge of the blank.

WILLIAM H. CURTIS.